J. M. GILSTRAP.
FRICTION DRIVING MECHANISM FOR MOTOR VEHICLES.
APPLICATION FILED AUG. 2, 1912.

1,048,406.

Patented Dec. 24, 1912.

Witnesses

Inventor
James M. Gilstrap
By Harry N. Copp
his Attorney

UNITED STATES PATENT OFFICE.

JAMES M. GILSTRAP, OF DELANO, CALIFORNIA.

FRICTION DRIVING MECHANISM FOR MOTOR-VEHICLES.

1,048,406.  Specification of Letters Patent.  Patented Dec. 24, 1912.

Application filed August 2, 1912. Serial No. 712,893.

*To all whom it may concern:*

Be it known that I, JAMES M. GILSTRAP, a citizen of the United States, residing at Delano, county of Kern, and State of California, have invented certain new and useful Improvements in Friction Driving Mechanism for Motor-Vehicles, of which the following is a specification.

This invention relates to friction driving mechanism for motor vehicles.

The present invention has for its objects the provision of a friction driving mechanism for motor vehicles which will be of simple, strong and durable construction, will equalize the pressure on the friction wheels, permit rapid shifting from low to high speed or vice versa, provide for powerful engagement of the driving and driven friction wheels and for regulation of the frictional contact thereof, and otherwise improve friction driving mechanism of this character.

In carrying out the invention I provide, first, a driven friction wheel of concave or hollow form and mounted for shifting in a new manner, permitting it to be shifted with facility from a position of minimum rate of revolution to other positions of increasing speed of revolution; second, a driving friction wheel and driven friction wheels adapted to engage opposite faces of the driver, together with novel means for mounting and moving the shafts of the driven friction wheels toward and away from the driving friction wheel, whereby the driven friction wheels may be made to engage the driving friction wheel with equal pressure and with any desired pressure, thus balancing the pressure on opposite sides of the driving friction wheel and thus tending to minimize wear on the parts and endwise movement of the drive shaft; third, new means for mounting the movable or shiftable shafts of the driven friction wheels and for shifting said shafts.

The invention is set forth fully hereinafter and the novel features are recited in the appended claims.

Figure 1:
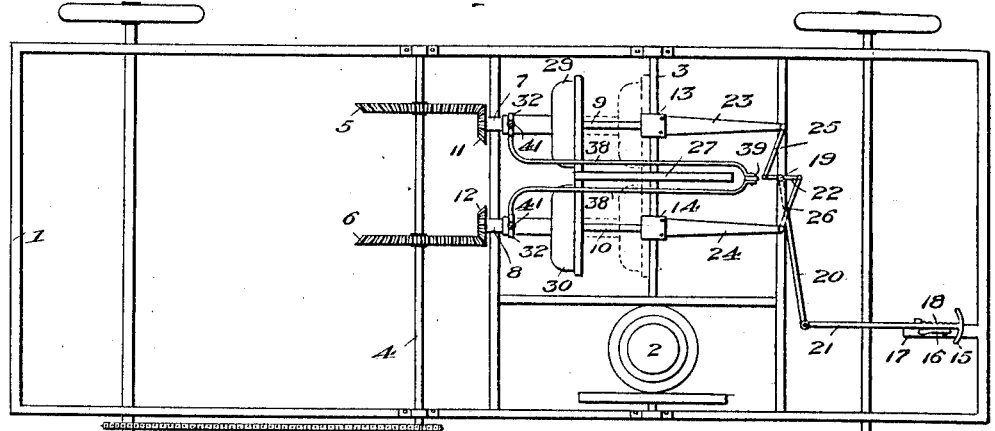
Figure 2:
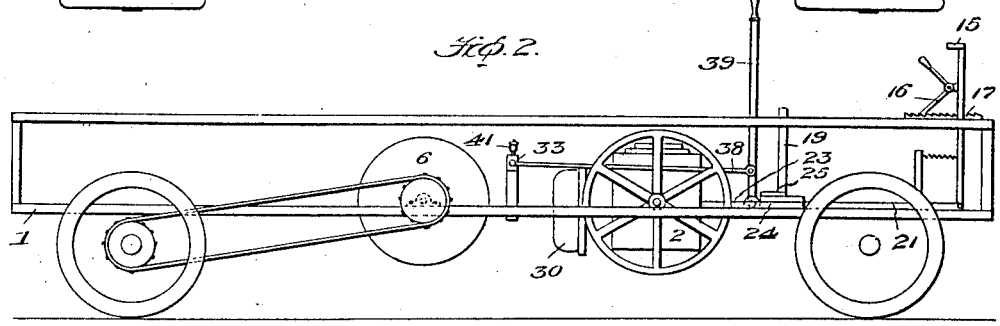
Figures 3, 4, 5:
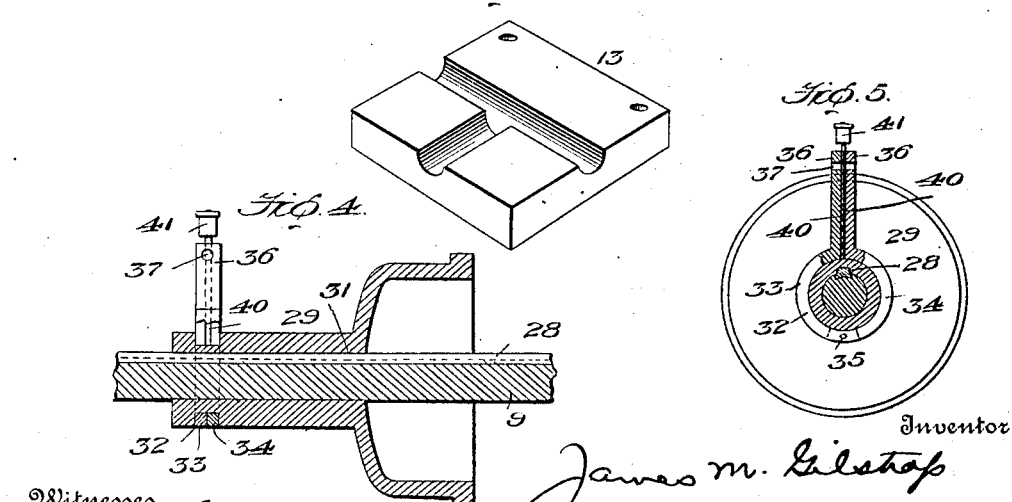

In the accompanying drawings: Figure 1 is a plan view showing the invention on a motor vehicle; Fig. 2, a side elevation; Fig. 3, a detail of the shiftable bearing for one of the driven shafts; Fig. 4, a longitudinal section through one of the driven friction wheels and its shaft; and Fig. 5, a cross section showing how the wheel is splined on its shaft.

The frame of the vehicle appears at 1, the engine or motor at 2 and the engine or drive-shaft at 3; the shaft which propels the vehicle appears at 4, being provided with bevel gears 5 and 6.

At 7 and 8 are pivoted boxes in which the shafts 9 and 10 are journaled, said shafts being provided with bevel pinions 11 and 12 meshing with the bevel gears 5 and 6, respectively. The forward ends of the shafts 9 and 10 are journaled in boxes 13 and 14 which are slidably mounted on drive shaft 3 so that the lines of shafts 9 and 10 intersect the line of shaft 3. Conveniently mounted on the vehicle so that it may be operated by the foot of the driver, is a lever 15 which is held in any position of adjustment by a pawl or dog 16 engaging a rack 17 on the vehicle. A spring 18 tends to throw the lever rearwardly. Mounted on the frame 1 is an upright shaft 19 having an arm 20 pivoted to a connecting rod 21 which is connected to the lever 15. The shaft 19 also carries a double arm 22. Rigidly secured to the boxes 13 and 14 are arms 23 and 24 which are connected by rods 25 and 26 to the members of the double arm 22. When the lever 15 is shifted, it turns the shaft 19, thereupon drawing the arms 23 and 24 toward each other and consequently shifting the boxes 13 and 14 and the shafts 9 and 10 toward each other. When the dog or pawl 16 is released from the rack 17, the spring 18 throws the arms 23 and 24 apart.

The driving friction wheel 27 is securely fixed to shaft 3. Seated in the shafts 9 and 10 are the longitudinal keys or splines 28. Slidable longitudinally on the shafts 9 and 10 are the friction wheels 29 and 30 which are provided with channels or seats 31 receiving the splines 28, whereby the said friction wheels always rotate with the shafts 9 and 10 and may be adjusted lengthwise thereof. The friction wheels 29 and 30 are adapted to frictionally engage with opposite sides of the driving friction wheel 27 and they are concaved so that they may be positioned at almost the exact center of the wheel 27, the concavities in these wheels 29 and 30 receiving the boxes 13 and 14. The sleeve portions of the friction wheels 29 and 30 are provided with annular grooves 32 which loosely receive split collars each composed of parts 33 and 34, the opposing faces of which being parallel with grooves 40 to form an oil passage. In the outer end of the passage is provided an oil cup 41. The parts 33 and 34 are pivoted together at 35 and provided with ears 36 having holes 37 through which pass the ends of connecting rods 38, the latter being provided with suitable clamp nuts to hold the members of the collars together in the annular grooves 32. A lever 39 carried by frame 1 and provided with any desired rocking mechanism has the rods 38 connected thereto so that on moving said lever, the friction wheels 29 and 30 are simultaneously and equally shifted in one direction or the other on their shafts 9 and 10 and consequently, the said friction wheels are driven at exactly the same speed, because they engage the driving wheel 27 at the same distance from the shaft 3 wherever said friction wheels may be positioned. By shifting the lever 39 to different positions, the engagement of the friction wheels 29 and 30 with the wheel 27 at different distances from the shaft 3 causes said friction wheels 29 and 30 to be rotated at different desired speeds and consequently the speed of the shaft 4, and hence the vehicle may be readily controlled from an extremely slow speed, as when the friction wheels 29 and 30 are in the dotted line position of Fig. 1, to the highest speed, as when they are in the full line position in said figure.

The frictional engagement of the wheels 29 and 30 with the wheel 27 may be made as light or as powerful as desired by manipulating the lever 15 or said wheels may be thrown entirely out of engagement with the driving wheel 29. The operation of the levers 15 and 39 being independent, the control of the speed of the vehicle and its instant stoppage or starting is rendered possible. The mounting of the boxes 13 and 14 on the shaft 3 renders it possible to aline the shafts 9 and 10 to mutually brace each other, while the concavity of the wheels 29 and 30 in connection with the mounting of the boxes 13 and 14 on shaft 3, enables the wheels 29 and 30 to be positioned almost at the center of the wheel 27 and enables the vehicle to be driven at a very slow speed.

I am aware that changes of construction might be resorted to in carrying out my invention, and I do not, therefore, limit myself to the precise constructions herein set forth, but consider that I am entitled to all modifications falling within the spirit and scope of the invention.

Having thus described my invention, what I claim as new and desire to secure by Letters Patent, is:—

1. In a friction driving mechanism for motor vehicles, the combination with a drive shaft and a friction drive wheel carried thereby, of shiftable shafts, boxes in which said shafts are mounted, said boxes being slidable on the drive shaft, and friction drive wheels carried by said shafts which are adapted to engage opposite sides of the driving wheel and have recesses to receive the boxes.

2. In a friction driving mechanism for motor vehicles, the combination with a drive shaft and a friction drive wheel carried thereby, of a shiftable shaft, a box in which said shaft is mounted, said box being slidable on the drive shaft, and a friction driven wheel carried by said shiftable shaft and adapted to engage the friction drive wheel, said driven wheel being provided with a concavity or recess adapted to receive the box aforesaid.

3. In a friction driving mechanism for motor vehicles, the combination with a drive shaft, of a friction drive wheel carried thereby, boxes slidable on said drive shaft, arms connected to the boxes, a rocker shaft having arms operatively connected to the arms aforesaid, driven shafts revolubly mounted in the boxes, friction wheels loosely splined to said driven shafts and provided with concavities adapted to receive the boxes aforesaid, and means for simultaneously shifting the driven friction wheels on their shafts.

In testimony whereof, I hereunto affix my signature in presence of two witnesses, July 23d, 1912.

JAMES M. GILSTRAP.

Witnesses:
F. B. HOWARD,
E. H. RAMSAY.

---

Copies of this patent may be obtained for five cents each, by addressing the "Commissioner of Patents, Washington, D. C."